United States Patent

Maurer

[11] Patent Number: 5,347,866
[45] Date of Patent: Sep. 20, 1994

[54] QUICK-CLAMPING AND CENTERING SYSTEM FOR WHEEL BALANCING APPARATUS

[75] Inventor: Ruprecht Maurer, Bad Homburg vor der Höhe, Fed. Rep. of Germany

[73] Assignee: Ringspann GmbH, Bad Homburg, Fed. Rep. of Germany

[21] Appl. No.: 42,083

[22] Filed: Apr. 1, 1993

[30] Foreign Application Priority Data

Apr. 16, 1992 [DE] Fed. Rep. of Germany ....... 4212799

[51] Int. Cl.$^5$ .......................................... G01M 1/00
[52] U.S. Cl. ...................................... 73/487
[58] Field of Search ............... 73/487, 484, 460, 485; 157/14, 20, 21; 269/48.1; 29/273

[56] References Cited

U.S. PATENT DOCUMENTS 4,918,986  4/1990  Warkotsch ............................ 73/487

FOREIGN PATENT DOCUMENTS 3808755  9/1989  Fed. Rep. of Germany .

*Primary Examiner*—Hezron E. Williams
*Assistant Examiner*—Christine K. Oda
*Attorney, Agent, or Firm*—Frishauf, Holtz, Goodman & Woodward

[57] ABSTRACT

To permit quick mounting and unmounting of a wheel (5) on a balancing machine, and rapid interchange of components of the balancing machine when wheels of different sizes arc, to be balanced, the shaft of the balancing machine has a conical surface (10) formed thereon, or is securely coupled to a first conical part (8), against which a radially expansible second conical part (9) can be engaged. The second conical part (9) has an outer cylindrical surface (12) for clamping in the center hole of a hub or wheel disk or the wheel (5) to be balanced. The second conical part (9) has an axially extending portion (9a), which terminates in a spring abutment (15, 16). A spiral spring (21) is placed around the extending portion, the other end of which engages against a radially directed leg portion (20, 24) of an angle ring (18, 25) which overlaps a radially extending stop (17, 22) formed on the outer conical part (9). The outer conical part (9), thus, together with the spring (21), the angle ring (18, 25) and the spring abutment (15) thereon form a single assembly, from which no parts can be lost or intermingled with parts of different sizes. The radially extending leg (24) of the angle ring and the stop (22) can be formed with matching conical surfaces (23, 26) to assist in pressing off the outer conical part (9) when a wheel is removed. The spring (21) is held in position between the spring abutment (15, 16) and the angle ring (18, 25), under pre-stressed condition.

6 Claims, 2 Drawing Sheets

QUICK-CLAMPING AND CENTERING SYSTEM FOR WHEEL BALANCING APPARATUS

REFERENCE TO RELATED PATENT DISCLOSURES

U.S. Pat. No. 4,918,986, Warkotsch, to which German Patent 38 08 755 corresponds
German Patent 38 26 185, Monch
German Utility Model GM 79 15 317, Schmidt.

FIELD OF THE INVENTION

The present invention relates to balancing apparatus for wheels, and more particularly to an arrangement to permit quickly mounting a vehicle wheel, such as an automotive vehicle wheel, on a balancing apparatus to permit static and/or dynamic balancing of the wheel.

BACKGROUND

It is known to provide an arrangement to mount wheels, and particularly vehicular wheels, on a shaft, usually a vertical shaft, by engaging the wheel disk or the hub thereof with a frictional counter element on one side and to clamp the other side of the wheel against the counter element. To ensure tight seating, a conical arrangement or conical assembly may be interposed between the central or shaft or hub opening of the wheel and the balancing shaft. A spring may be provided to ensure that the conical arrangement seats tightly, and to bias the conical arrangement in a direction to provide for snug engagement of the conical assembly, typically including an expansible part with a cylindrical outer surface, with the centering hole of the wheel or the hub.

The referenced U.S. Pat. No. 4,918,986, Warkotsch, to which German Patent 38 08 755 corresponds, describes a quick clamping arrangement of this type in which the conical assembly is formed by two parts, one of which is freely axially shiftable on the shaft. The spring element is located either between the flange and the second part, or the second part is located against the flange and the spring is tightened or stressed against the first part of the conical assembly. Upon clamping the wheel, the hub is pressed against the flange and, further, the conical parts are relatively shifted axially such that the outer one thereof can radially expand by sliding against the inner one of the conical parts, thereby securely centering the hub opening in the wheel to be balanced on the balancing machine shaft.

It has been found in use that difficulties arise since the seating and clamping arrangements must be exchanged on the balancing machine shaft when different sizes of wheels are to be balanced. The conical assembly and the springs form loose parts of sets designed to accommodate differently sized wheels, with different hub openings on the balancing machine. In order to balance a specific wheel, the parts of the specific set must be assembled, fitted together, and only then can the wheel be balanced. This requires skill and a comparatively time-consuming assembly operation, all done by hand. The danger is ever present that parts from one set become intermingled with parts from another set and, before the respective sets can then be used, it is necessary to sort the individual parts which pertain to any specific set.

The arrangement is comparatively time-consuming in use since the spring, when being placed on the machine, is in unstressed position and a sufficiently long spring path must be overcome before the spring is sufficiently tight to provide effective spring biasing pressure. This requires overcoming a comparatively long spring travel path, usually by tightening a nut, or a screw, which further increases the time necessary to balance a specific wheel on the balancing machine.

THE INVENTION

It is an object to provide a quick-clamping arrangement for balancing machines, and more particularly to improve the basic system of well-known balancing machines, by so constructing the centering arrangement that the respective sets of parts for different size wheels are connected together, and that the number of individual parts, further, is reduced. This prevents intermingling of parts intended for different sizes of wheels. Additionally, the time taken to mount and unmount wheels on balancing machines should be reduced.

Briefly, the quick-clamping and centering system has a conical assembly formed of an inner part with a conical outer surface and an outer part, which is radially expandable, formed with a matching inner surface. The inner part is centrally located on the shaft of the balancing machine and, in its simplest form, may be unitary with the balancing shaft which can be turned on a lathe to have the specific conical surface. Alternatively, it can be secured to the shaft in form of a sleeve. The outer part is formed with an axial extension which extends inwardly of a flanged bell-shaped counter element for the wheel, and therebeyond. A radially extending stop is located on the outer part beyond that side of the wheel. The outer part terminates inside of the bell-shaped counter element in a hollow cylindrical portion which includes a spring abutment against which a compression spring can bear. The other end of the compression spring is supported by an angle ring which has an axial portion overlapping the stop and a radial portion against which the spring can bear.

Consequently, the spring will be located entirely on the outer conical part or, rather, on the axial extension thereof, retained between the spring abutment and the angle ring; the angle ring, in turn, is retained by its overlapping portion extending over the radial stop. This results in a single unitary assembly, in which no parts can get lost when the outer part is removed from engagement with the inner conical part and, for example, replaced by an outer part which has a cylindrical seating surface for the hub of a wheel of a different size than that previously used.

The assembly formed by the outer part, spring and angle ring thus is a mutually interengaging assembly, in which the individual parts cannot become lost. It is then only necessary to replace one such assembly with another one if wheels of different sizes are to be balanced. Loss of any components, and intermixing of parts of the assembly with parts from another assembly, is not possible.

The fixed connection of the inner conical part with the shaft further reduces the number of parts of the quick-clamping system. In accordance with a feature of the invention, the conical surface is formed on the shaft itself, for example on a lathe. Of course, it is equally possible to fit a sleeve with an inner cylindrical opening on a cylindrical shaft, in which the sleeve is formed with an outer conical surface, and securely attached to the shaft, for example shrink-fitted thereon, splined and press-fitted, or the like.

The spring, in accordance with a feature of the invention, can be fitted in the assembly, surrounding the outer conical part, while it is already in stressed condition. This reduces the time taken to mount a wheel on the balancing apparatus since a portion of the spring path necessary to compress the spring to obtain a starting spring bias force need not be done manually after mounting the wheel. This facilitates mounting of wheels and reduces the mounting time.

The hollow cylindrical end portion which terminates the region of the outer part, extending into the clamping bell, is preferably dimensioned so that it can easily fit on and be guided by the shaft.

In accordance with a preferred feature of the invention, the stop may be formed with an inwardly radially extending additional conical surface which fits against a complementary conical surface formed in the radial portion of the angle ring. This arrangement has the advantage that when the wheel is unclamped, the expansible, spreadable conical portion of the expansible portion is pressed by the further conical surface in a direction counter the spreading movement, so that the radial spreading is forcibly reversed. This facilitates removal of the wheel after it has been clamped in the balancing machine. The additional conical surface of the stop and of the radial portion of the angle ring, respectively, interact upon pressure by the spring against the engaged conical surfaces, when the clamping pressure on the wheel is released.

DRAWINGS

FIG. 1 is a highly schematic axial view, partly in section, of one-half of an otherwise rotation-symmetrical clamping arrangement, in which the wheel is shown only highly schematically by a wheel disk and small flange; and FIG. 2 is a view similar to FIG. 1 illustrating another embodiment of the present invention.

DETAILED DESCRIPTION

Figure 1:
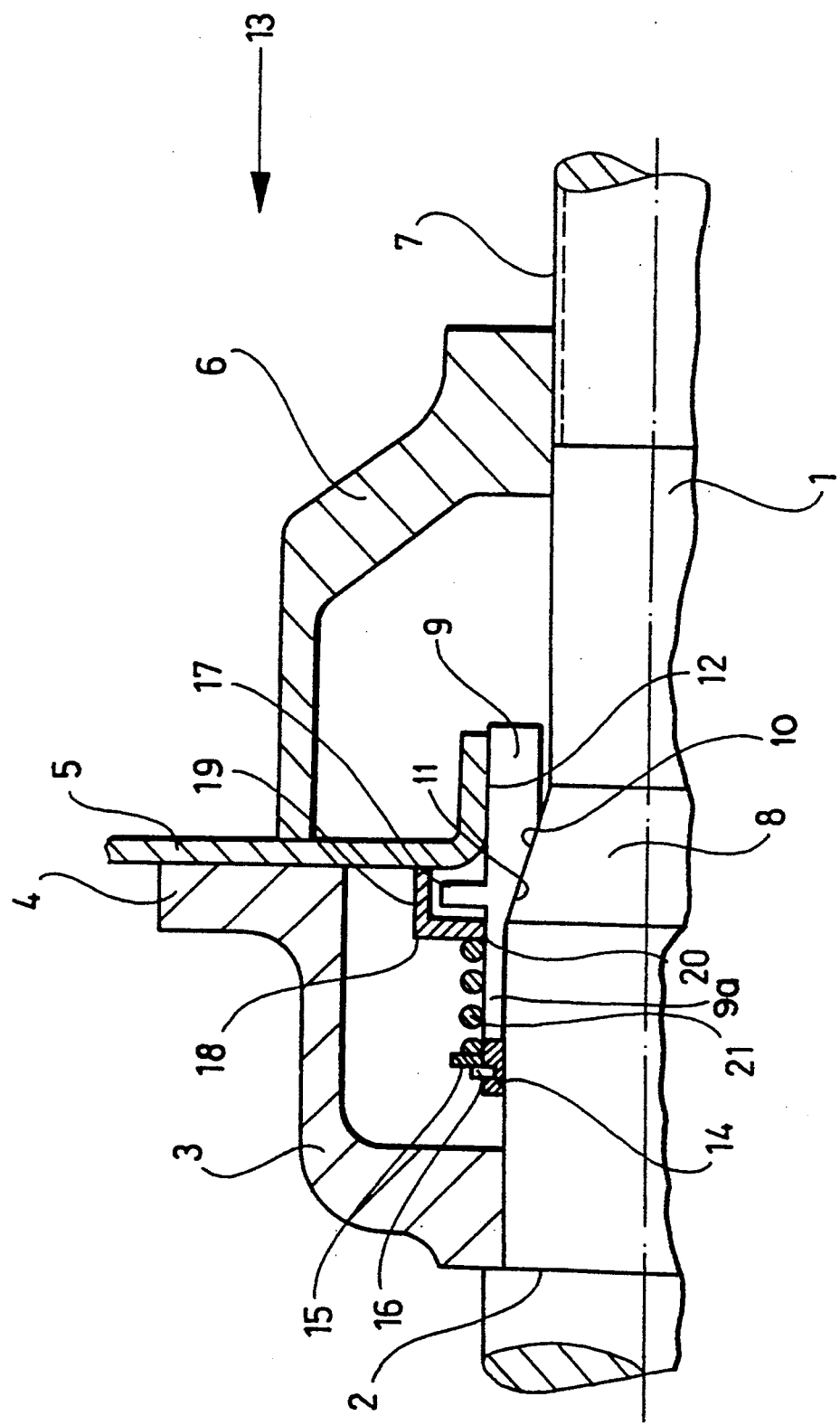

Referring first to FIG. 1:

The shaft 1 of a balancing machine is formed with a step or abutment surface 2. Normally, the shaft 1 would be vertical. The balancing machine itself is not shown since it may be of any suitable construction. A flange 3, which is essentially bell-shaped, but may be in spider or cage form, is fitted against the shoulder 2 on the shaft 1. The bell or cage-like flange 3 terminates in a radial flat flange 4. This forms one stop or counter or abutment surface for a hub or center portion of a wheel 5. The wheel 5 is clamped against the flange 4 by a clamping bell or clamping cage 6. The left end of the cage 6—with respect to FIG. 1—engages the wheel 5; the right end can be clamped axially by threading a suitable threading nut on a threaded portion of the shaft 1, which is illustrated schematically by thread 7. The clamping nut and details have been left off the drawing for simplicity of illustration, since both may be of any well-known construction.

A conical surface 8 is formed on the shaft 1. It expands conically in the direction of clamping force. A second or outer conical part 9, having an inner conical surface 11, is fitted on the conical surface 10 of the conical part 8. The part 9 is radially expandable. It has a cylindrical outer surface 12 which fits in the center bore or opening of the wheel 5.

In accordance with a feature of the invention, the part 9 includes an axially extending portion 9a which terminates in a hollow cylindrical end or terminating portion 14, fitted over the shaft 1. Portion 14 is formed with a spring abutment ring or washer 15. To permit easy assembly, the spring abutment washer 15 is fitted over the terminating portion 14 and, after assembly, and compression of a spring 21 over the extending portion of part 9, is retained on the end portion by a C-snap ring 16.

In accordance with a further feature of the invention, the extending portion 9a of the outer conical part 9 has a radially extending stop 17, for example in form of a ring located thereon, for example integral with the part 9. The stop 17 is positioned at the first or left side of the wheel 5 with a small space therefrom. An angle ring 18 overlaps the stop 9. A radially directed leg 20 of the angle ring 18 is positioned behind or beyond the stop 17. The angle ring 18 has a leg 19, extending axially from radial leg 20 towards the wheel 5, and engages thereagainst. The spring 21 engages against the radially directed portion 20 and thus is prestressed between the radial portion 20 of the angle ring 18 and the abutment 15 on the terminal or end portion 14 of the outer conical part 9.

ASSEMBLY AND OPERATION

A wheel is clampled in position, as shown in FIG. 1. The wheel can slide loosely over the surface 12 of the part 9. Spring 21 presses the radial leg 20 against the stop 17 towards the right. When a suitable clamping nut is threaded on the thread 7 of the shaft, the cage or clamping bell 6, or other suitable clamping arrangement engages the wheel 5 and shifts the wheel 5 from the right towards the left, with respect to FIG. 1. This causes the wheel 5 to engage the axially extending leg 19 of the angle ring 18, lifting the angle ring 18 off the stop 17 against the force of prestressed spring 21, further stressing the spring 21. Spring 21, before the wheel has been placed thereon, is under pre-tension to normally bias the angle ring 18 towards the right.

As can be seen, only a small distance is needed to stress the spring 21 until it has the required compressive force in order to push the portion 9 on the conical surface 10 of the cone part 8 that the radially expansible portion 9 can engage tightly and snugly into the hole or hub of the wheel 5. Play between the cylindrical surface 12 of the expansible cone ring 9 thus is effectively eliminated and the wheel is accurately centered.

To release the clamping connection, the clamping nut (not shown) is moved towards the right. This then permits the spring force of the spring 21 to push the wheel 5 to the right and, upon engagement of the radially directed leg 20 with the stop 17, permitting the wheel 5 to come free from the part 9 for removal.

Figure 2:
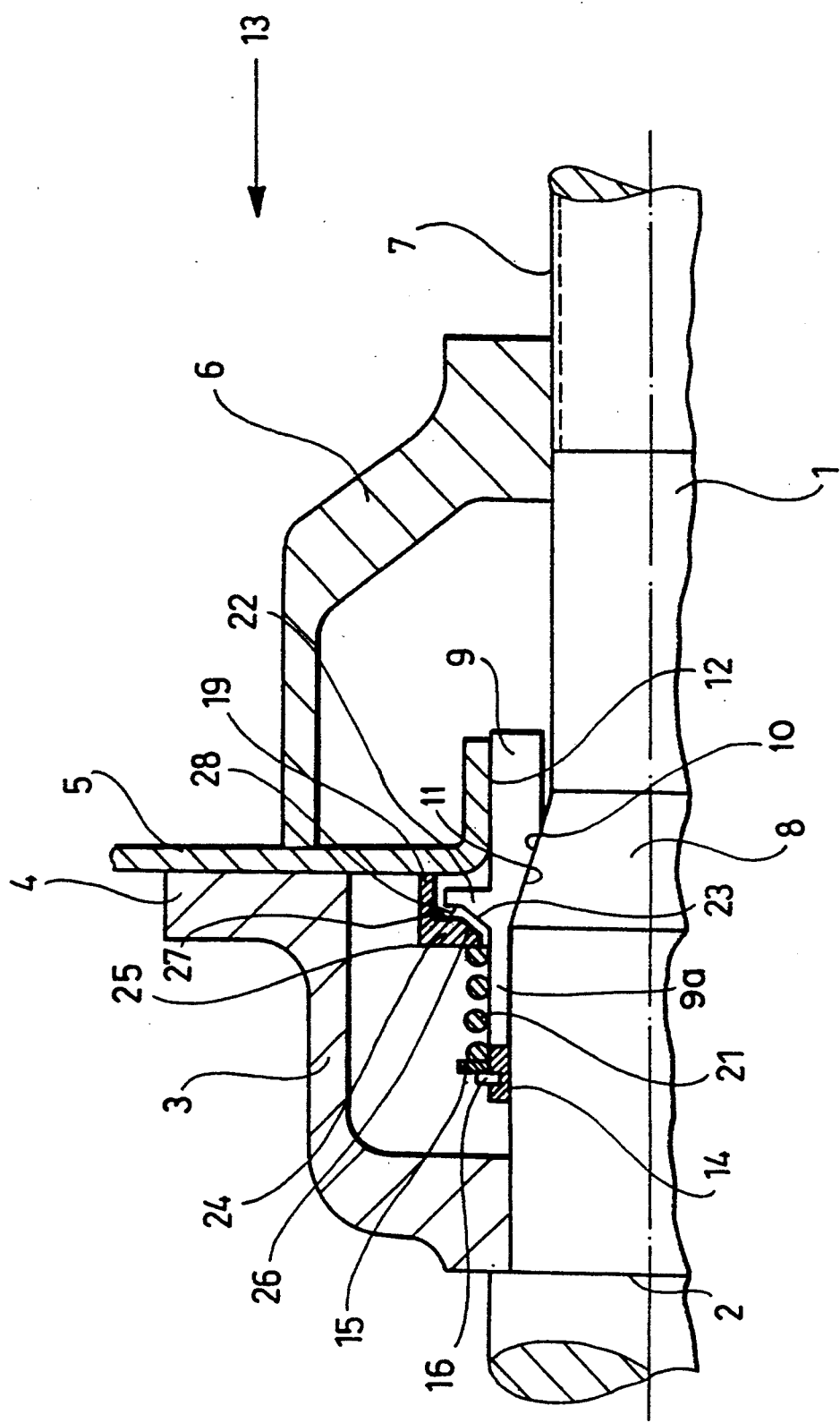

The embodiment of FIG. 2 is basically identical to that of FIG. 1 and all identical parts have been given the same reference numeral. The embodiment of FIG. 2 has the additional advantage of even better and faster release of the wheel 5 from the outer conical part 9. The difference between the embodiment of FIG. 1 and FIG. 2 is this: The stop 22, corresponding to the stop 17 of FIG. 1, is formed with a radially inwardly directed conical surface 23, extending away from the wheel 5. The radial leg 24 of the angle ring 5 is formed with an inner, matching conical surface 26.

OPERATION, WITH REFERENCE TO FIG. 2

The clamping operation is identical to that described with respect to FIG. 1. Upon release of a clamping force, for example by unscrewing a nut from thread 7 at the right side of the shaft, the conical surface 26 is pressed by the spring 21 against the conical surface 23 on the stop element 22. This presses the element 9 towards the right and, hence, the radially spreadable portion of the part 9 will move centrally or inwardly, that is towards the central axis of the shaft. This permits the part 9 to slide or slip on the conical surface 8 and, in turn, permits easier release of the wheel 5 from part 9.

The radially inwardly directed movement of the spreading portion of the outer conical part 9 only ends when the radial plane surface 27 of the radial leg 24 of the ring 25, and the plane surface 28 of the stop 22 engage against each other.

Both embodiments, FIG. 1 as well as FIG. 2, have the feature in common that the outer conical element 9, spring 21 and the angle ring 18, or 25, respectively, form a single assembly having no loose parts. Thus, such a single assembly can be easily exchanged for another one having, for example, different radial dimension of the surface 12, without danger of loss of any parts or components, or intermixing of parts or components of different assemblies.

Both embodiments have the further advantage that the spring 21, upon first manufacture of the assembly, can be pre-stressed before the abutment ring 15 is placed on the extension part 9a of the outer conical part 9, and then secured in position by the snap ring 16. This substantially reduces the axial path of a rotatable nut, threaded on the thread 7. Only a comparatively small axial movement is required in order to finally stress the spring 21 to apply the desired spring force against the wheel disk 5 to frictionally clamp the wheel securely in position.

Various changes and modifications may be made within the scope of the inventive concept.

I claim:

1. Quick-clamping and centering system for a wheel balancing apparatus, wherein the apparatus has
   a shaft (1);
   a first clamping element (3, 4) secured to the shaft (1) and dimensioned to be frictionally engaged with a first side of a wheel (5) to be balanced;
   clamping means (6, 7) located on said shaft (1) and positioned and dimensioned for frictional engagement with a second side of the wheel, and for thereby clamping said wheel against the first clamping element (4);
   a two-part centering assembly (8, 10, 9, 11) having an inner part (8) with an outer conical surface (10), and an outer part (9) having an internal conical surface (11) surrounding said inner part, and engageable against said external conical surface,
   wherein the outer part (9) is radially expandable and is formed with an outer, essentially cylindrical surface (12) for engagement within a central opening in the wheel (5); and
   a spring means (21) positioned for biasing the centering assembly in a direction to radially expand the outer part (9) for secure seating into the central opening of the wheel (5), and
   wherein, in accordance with the invention,
   the inner part (8) with the outer conical surface (10) is fixedly located on said shaft (1);
   the outer part (9) has an axial extension (9a) extending beyond the first side of the wheel (5);
   radially extending stop means (17, 22) on said outer part (9) located beyond, and spaced from the first side of the wheel;
   a hollow cylindrical portion (14) terminating said axial extension and surrounding said shaft;
   spring abutment means (15, 16) on said hollow cylindrical portion, against which said spring means (21) is positioned,
   said axial extension extending for a distance to space said hollow cylindrical portion and said spring abutment means from said stop means (17, 22) by a distance sufficient to accommodate said spring means, under pre-tension; and
   an angle ring (18, 25) having
   an axial leg portion (19, 27) overlapping said stop means (17, 22), with clearance, engageable against said first side of the wheel (5), and
   a radial leg portion (20, 24) located between said spring abutment means (15, 16) and said radially extending stop means (17, 22), and engaged by said spring means (21) and forming a spring biasing surface for said spring means (21).

2. The system of claim 1, wherein said hollow cylindrical portion (14) is slidably guided on said shaft (3).

3. The system of claim 1, wherein said radial leg portion (24) of the angle ring (25) has an inwardly positioned conical surface expanding towards the center axis of said shaft (1); and
   said stop means (22) has a conical surface engageable by and essentially matching the cone angle of the conical surface (26) of the radial leg portion (24) of the angle ring (25) to counteract radial expansion of said outer part (9) upon loosening of clamping engagement of said clamping means (6, 7), and hence contribute to ready removal of said wheel (5) from said system.

4. The system of claim 1, wherein said outer conical part (9), said spring means (21), said abutment means (15) and said angle ring (18, 25) form a unitary assembly.

5. The system of claim 1, wherein said first clamping element (3, 4) is of essentially bell or cage shape.

6. The system of claim 5, wherein the axial extension (9a) of the outer part (9) is located inwardly of the essentially bell or cage-shaped first clamping element (3, 4).

* * * * *